United States Patent Office 3,117,971
Patented Jan. 14, 1964

3,117,971
10-AMINO DERIVATIVES OF YOHIMBANE ALKALOIDS
John Shavel, Jr., Mendham, N.J., assignor to Warner-Lambert Pharmaceutical Company, Morris Plains, N.J., a corporation of Delaware
No Drawing. Filed Sept. 6, 1961, Ser. No. 136,189
7 Claims. (Cl. 260—287)

The present invention relates to new and novel 10-amino derivatives of alkaloids of the yohimbane series having the formula:

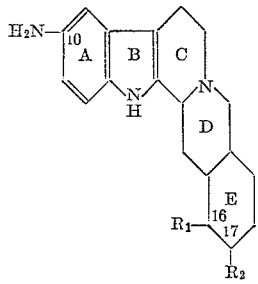

wherein $R_1$ is hydrogen or methyl and $R_2$ is hydrogen, keto or hydroxyl and to the pharmaceutically acceptable non-toxic acid addition and quaternary ammonium salts thereof. The invention also relates to a method of preparing the above compounds and to new and novel intermediates obtained in the course of the synthesis.

The new and novel 10-amino derivatives of yohimbane alkaloids of my invention have significant and interesting pharmacological activity and are particularly useful as analgesics and tranquilizers. In addition, these 10-amino derivatives, as well as the new and novel intermediates obtained in the production of these compounds, are all valuable intermediates in the production of other compounds of the yohimbane series.

The compounds of this invention bear the A, B, C, D and E rings as depicted in the above structural formula and are, generally, alkaloids of the yohimbane series. Depending upon the configuration of the hydrogen atom at the 3-position and the existence of cis or trans fusion of the D and E rings, four different configurations are possible, that is yohimbane, 3-epiyohimbane, alloyohimbane and 3-epialloyohimbane. The present invention includes within its scope derivatives of these four families of alkaloids bearing amino, $R_1$ adn $R_2$ substituents at the 10, 16 and 17 positions, respectively.

The starting materials for the production of the compounds of my invention are 10-acyl substituted alkaloid derivatives having the formula

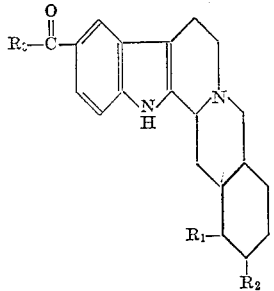

wherein $R_1$ and $R_2$ are as described hereinabove and $R_3$ is an alkyl group containing 1 to 5 carbon atoms. Such starting materials are prepared as described in the copending applications of John Shavel, Jr., filed February 10, 1961, and entitled "Alkaloid Derivatives of the Yohimbane Series and Process Therefor" and "Derivatives of 17-Ketoyohimbane Alkaloids and Process Therefor," Serial Numbers 88,303 and 88,306, respectively.

I have now found that 10-acylated starting materials of the above formula are converted to the 10-aminoyohimbane alkaloids of my invention in a three step synthesis comprising, first, the reaction of the starting material with hydroxylamine to form the corresponding oxime, treating the oxime with trifluoroacetic acid to form the corresponding amide and finally hydrolyzing the amide by treatment with acid. The oximes and amides obtained in the course of the synthesis are new and novel compounds and are included within the scope of my invention.

The first step of my reaction involves the reaction of the starting material with hydroxylamine. In the case of starting materials having a keto group at the 17-position, for example, 10-acyl derivatives of yohimbone and 16-methylyohimbone, it is essential that the keto group be protected during the reaction with hydroxylamine since without such protection, an undesired oxime will also form at the 17-position. Accordingly, 17- keto starting materials are initially treated with a lower aliphatic alcohol having 1 to 6 carbon atoms to form a 17,17-(di-lower alkoxy)compound. Such di-ketals are resistant to reaction with hydroxylamine.

I have found that the treatment of a compound of the formula

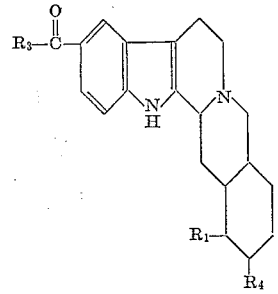

wherein $R_1$ and $R_3$ are as described hereinabove and $R_4$ is hydrogen, hydroxyl and di-lower alkoxy with hydroxylamine under reflux for about 1 to about 6 hours in the presence of an inert solvent system such as a mixture of pyridine and ethanol yields an oxime of the formula

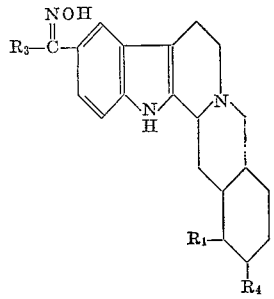

The hydroxylamine is normally added in the form of a salt such as the hydrochloride. Anhydrous conditions should be maintained during the reaction. The oxime separates as crystals from the reaction mixture and is recovered and recrystallized by conventional procedures.

The second step in my synthetic procedure is the reaction of the oxime prepared as described above with trifluoroacetic acid to form an amide having the following formula:

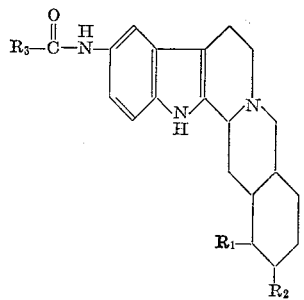

wherein $R_1$, $R_2$ and $R_3$ are as described above. In this reaction, oximes having di-lower alkoxy substituents at the 17-position are converted to amides having a keto group at the 17-position, trifluoroacetic acid serving to destroy the diketal and to regenerate the ketone function. The mixture of the oxime and a substantial excess of trifluoroacetic acid, which also serves as a solvent in the reaction, is refluxed until the reaction is complete, a procedure normally requiring about 3 hours. Recovery of the amide is effected by pouring the reaction mixture onto crushed ice which has been made basic with a dilute alkali such as ammonium hydroxide, followed by extraction with chloroform. The amide is recovered from the extract by conventional procedures and may be purified by recrystallization.

The third step in my synthesis is the hydrolysis of the amide prepared as described above to form the 10-amino derivatives of my invention having the formula

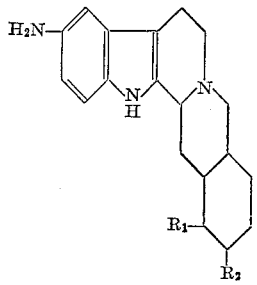

by refluxing in an acidic medium, for example a mixture of glacial acetic acid and hydrochloric acid. At the conclusion of the reaction, the mixture is poured onto crushed ice made basic with a dilute alkali such as ammonium hydroxide, followed by extraction with chloroform. The product is recovered from the extract and is purified by conventional procedures.

The compounds of this invention may be converted into their pharmaceutically acceptable non-toxic acid addition or quaternary ammonium salts. Useful acid-addition salts are those formed with such acids as maleic, fumaric, benzoic, succinic, methylsulfonic, sulfonic, citric, tartaric, salicylic, malic, cinnamic, hydrochloric, hydrobromic, phosphoric and the like. The acid addition salts may be prepared in the conventional manner, for example, by treating a solution of suspension of the free base in an organic solvent with the desired acid, and then recovering the salt which forms by crystallization techniques. The quaternary salts are prepared by heating a solution of the base in a suitable solvent with a reactive alkyl halide such as methyl iodide, ethyl bromide, n-hexyl bromide, benzyl chloride or another reactive ester such as methyl sulfate, ethyl sulfate or methyl p-toluene sulfonate.

For therapeutic use, the new and novel compounds of this invention, either as the free base or in the form of a pharmaceutically acceptable, non-toxic acid addition or quaternary ammonium salt, may be formulated with a conventional pharmaceutical carrier to form tablets, capsules, elixirs, solutions, suspensions, suppositories and the like.

The following examples are included in order further to illustrate the present invention:

*Example 1.—10-Acetylyohimbane Oxime*

A solution of 50 g. 10-acetylyohimbane, 30 g. hydroxylamine hydrochloride, 130 ml. pyridine, and 130 ml. absolute ethanol is refluxed for four hours. The solution is allowed to stand overnight at room temperature and the crystals which separate are collected, washed with absolute ethanol, and then partitioned between aqueous ammonium hydroxide and chloroform. The chloroform solution is dried over sodium sulfate and distilled in vacuo to dryness. The residue is recrystallized from acetonitrile to give 25 g. of needles. M.P. 252–255° dec., $[\alpha]_D^{25}$ —75° (pyridine, c.=0.46). Recrystallization from acetonitrile gives 10-acetylyohimbane oxime, M.P. 250–254° dec., $[\alpha]_D^{25}$ —79° (pyridine, c.=0.75).

*Analysis.*—Calc.: C, 74.73; H, 8.07; N, 12.45. Found: C, 74.76; H, 8.13; N, 12.27.

The ethanol-pyridine mother liquor from the original reaction mixture is distilled in vacuo to dryness, the residue is dissolved in dilute acetic acid, the solution is basified with ammonium hydroxide, and extracted with chloroform. The chloroform solution is dried over sodium sulfate and distilled in vacuo to dryness to give a residue which on recrystallization from acetonitrile yields 23 g. of material, M.P. 222–232° dec., $[\alpha]_D^{25}$ —102° (pyridine, c.=0.48). Recrystallization from acetontrile gives a mixture of 10-acetylyohimbane and another isomer, the mixture having a melting point of 238–243° dec., $[\alpha]_D^{25}$ —91° (pyridine, c.=0.61).

*Analysis.*—Calc.: C, 74.73; H, 8.07; N, 12.45. Found: C, 74.57; H, 7.92; N, 12.37.

*Example 2.—10-Acetamidoyohimbane*

A solution of 25 g. 10-acetylyohimbane oxime (M.P 250–254°) in 200 ml. trifluoroacetic acid is refluxed for three hours. The solution is poured onto crushed ice, basified with ammonium hydroxide, and extracted with three 1000 ml. portions of chloroform. A considerable amount of solid remains undissolved and suspended in the chloroform layer. This is separated from the aqueous phase together with the chloroform phase. To the chloroform suspension are added 450 ml. methanol and the resulting clear solution is dried over sodium sulfate and distilled in vacuo to dryness. The residue is recrystallized twice from methanol to give 22.8 g. of product, M.P. 296–300° dec., $[\alpha]_D^{25}$ —60° (pyridine, c.=0.51). Another recrystallization from methanol gives 10-acetamidoyohimbane, M.P. 290–294° dec., $[\alpha]_D^{25}$ —62° (pyridine, c.=0.59).

*Analysis.*—Calc.: C, 74.74; H, 8.07; N, 12.45. Found: C, 74.49; H, 8.12; N, 12.45.

*Example 3.—10-Aminoyohimbane*

A solution of 16.9 g. 10-acetamidoyohimbane in a mixture of 20 ml. glacial acetic acid and 100 ml. concentrated hydrochloric acid is refluxed 5.5 hours. The solution is poured onto crushed ice, basified with ammonium hydroxide, and extracted with three 100 ml. portions of chloroform. The chloroform solution is dried over sodium sulfate and distilled in vacuo (under a nitrogen atmosphere) to dryness. The residue is dissolved in 100 ml. 50% acetic acid, an excess of a saturated aqueous solution of ammonium chloride is added, and the mixture is refrigerated overnight. The white crystals are collected and recrystallized from water to yield 14.8 g. of crystals, M.P. 322–326° dec., $[\alpha]_D^{25}$ —32° (water, c.=0.4). Recrystallization from water yields the dihydrochloride salt of 10-aminoyohimbane as the monohydrate, M.P. 319–320° dec., $[\alpha]_D^{25}$ —34° (water, c.=0.4).

*Analysis.*—Calc.: C, 59.06; H, 7.52; N, 10.88. Found: C, 58.87; H, 7.74; N, 10.96.

An aqueous solution of 1.0 g. of 10-aminoyohimbane dihydrochloride monohydrate is basified with ammonium hydroxide and extracted with chloroform. The chloroform solution is dried over sodium sulfate and distilled in vacuo under a nitrogen atmosphere to dryness. The residue is recrystallized from acetonitrile to give 0.27 g. of 10-aminoyohimbane, M.P. 235–237° dec., $[\alpha]_D^{25}$ —73° (pyridine, c.=0.52).

*Analysis.*—Calc.: C, 77.24; H, 8.53; N, 14.23. Found: C, 76.96; H, 8.60; N, 13.96.

In the foregoing examples, all temperatures are given in degrees centigrade.

It is understood that the foregoing detailed description is given merely by way of illustration and that many variations may be made therein without departing from the spirit of my invention.

Having described my invention, what I desire to secure by Letters Patent is:

1. A member selected from the group consisting of compounds of the formula

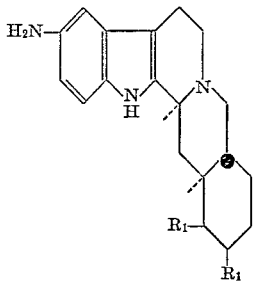

wherein $R_1$ is a member selected from the group consisting of hydrogen and methyl and $R_2$ is a member selected from the group consisting of hydrogen, keto and hydroxyl, and the pharmaceutically acceptable non-toxic acid addition salts thereof.

2. 10-aminoyohimbane.
3. 10-aminoyohimbane dihydrochloride.
4. A compound of the formula

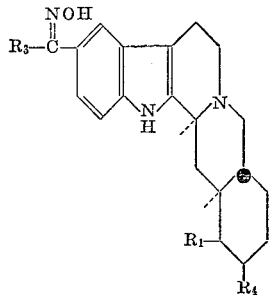

wherein $R_1$ is a member selected from the group consisting of hydrogen and methyl, $R_3$ is an unsubstituted alkyl group containing 1 to 5 carbon atoms and $R_4$ is a member selected from the group consisting of hydrogen, hydroxyl and di-lower alkoxy.

5. 10-acetylyohimbane oxime.
6. A compound of the formula

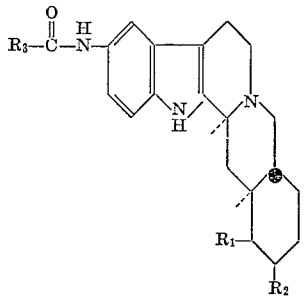

wherein $R_1$ is a member selected from the group consisting of hydrogen and methyl, $R_2$ is a member selected from the group consisting of hydrogen, keto and hydroxyl and $R_3$ is an unsubstituted alkyl group containing 1 to 5 carbon atoms.

7. 10-acetamidoyohimbane.

References Cited in the file of this patent

UNITED STATES PATENTS 2,793,210　Voegtli ---------------- May 21, 1957

OTHER REFERENCES

Wagner et al.: Synthetic Org. Chem., New York, Wiley (1953), page 157.

Degering: Outline of Org. Nitrogen Compounds, Univ. Lithoprinters, Ypsilanti, Michigan (1950), pages 176, 177, 402.

Theilheimer I: Syn. Meth. of Org. Chemistry, Interscience, New York, volume 14 (1960), page 314.

Theilhemier II: Syn. Meth. of Org. Chemistry, Interscience, New York, volume 13 (1959), page 113.